United States Patent
Bois et al.

(10) Patent No.: US 8,363,538 B2
(45) Date of Patent: Jan. 29, 2013

(54) ORTHOGONAL DATA LINK, AND ASSOCIATED METHODS

(75) Inventors: Karl Joseph Bois, Fort Collins, CO (US); Derek L. Knee, Fort Collins, CO (US); Vaishnav Srinivas, Los Angeles, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2764 days.

(21) Appl. No.: 10/366,932

(22) Filed: Feb. 14, 2003

(65) Prior Publication Data

US 2003/0214904 A1 Nov. 20, 2003

Related U.S. Application Data

(63) Continuation-in-part of application No. 10/151,572, filed on May 20, 2002.

(51) Int. Cl.
*H04J 11/00* (2006.01)
(52) U.S. Cl. ........................................ 370/209
(58) Field of Classification Search .............. 370/208, 370/209
See application file for complete search history.

(56) References Cited

FOREIGN PATENT DOCUMENTS

EP    1158477    11/2001

OTHER PUBLICATIONS

Ryuji Yoshimura et al., 'DS-CDMA Wired Bus with Simple Interconnection Topology for Parallel Processing System LSIs', IEEE International Solid-State Circuits Conference, 2000, IEEExplore abstract and pp. 1-2.*
Chi-Kin Chan et al., 'Efficient Use of Pseudo-Noise Sequences in Synchronous Direct-Sequence Spread Spectrum Multiple-Access Communication Systems', IEEE Vehicular Technology Conference, Jun. 1994, IEEExplore abstract and pp. 540-544.*
Vaishnav Srinivas et al., 'Gigabit Simultaneous Bi-directional Signaling using DS-CDMA', IEEE, 2002, pp. 15-18.*
Mau-Chung Frank Chang et al., 'RF-Interconnect for Future Inter- and Intra-ULSI Communications', IEDM Technical Digest, 2001, IEEExplore abstract and pp. 23.4.1-23.4.4.*

* cited by examiner

*Primary Examiner* — Melvin Marcelo

(57) ABSTRACT

An orthogonal data link is provided by a first digital device, a second digital device, and a bus coupling the first digital device to the second digital device. The first digital device has a first transmitter that encodes data of the first device with a first code (e.g., [1,1]), for transmission on the bus. The second device has a second transmitter that encodes data of the second device with a second code (e.g., [0,1] or [1,0]), for transmission on the bus. The first device has a first receiver that renders the second data by (a) multiplying signals of the bus with the second code and (b) integrating over a periodicity of the codes. The second device has a second receiver that renders the first data by (a) multiplying signals of the bus with the first code and (b) integrating over a periodicity of the codes.

29 Claims, 5 Drawing Sheets

ORTHOGONAL DATA LINK, AND ASSOCIATED METHODS

RELATED APPLICATIONS

This application is a continuation-in-part of, and claims priority to commonly-owned and co-pending U.S. application Ser. No. 10/151,572, entitled ENCODED MULTI-ACCESS BUS SYSTEM AND METHOD, filed May 20, 2002 and incorporated herein by reference.

BACKGROUND OF THE INVENTION

A point-to-point duplex communication link is known in the prior art to include a bus with multiple transmitters that operate on a non-concurrent basis. Specifically, only one of the transmitters communicates at any given time on the bus, typically by managing transmissions of each transmitter to avoid collisions.

Such a point-to-point duplex communications link has an inherent latency since only one transmitter communicates at any one time; one transmitter must therefore wait while the other transmits data on the bus. Another delay adds to the latency since a bus turnaround time is needed before the waiting transmitter can transmit, for example to avoid reflections on the bus. A further delay is added to the latency because a separate control device is needed to manage the non-concurrent transmissions, and that control device too has an inherent delay. Yet another latency typically occurs on the afore-mentioned communications link since additional logic may be used to ensure that data packets are received and complete at the intended bus receiver. The control device and/or the additional logic add architectural complexity to systems incorporating the link.

Another prior art point-to-point duplex communications link has multiple transmitters that concurrently communicate on the bus. Each of the transmitters has an associated receiver. Each receiver operates to subtract the signal from its respective transmitter to obtain the underlying signal.

Among other reasons, this duplex communications link is difficult to implement because of the complexity associated with subtraction at the receiver. By way of example, the subtraction must be extremely linear to avoid data corruption. Moreover, the desired data and the unwanted data must be entirely synchronous or else additional errors occur during subtraction. The bus also affects how synchronous the bus signals are, adding further complexity due to reflections, attenuation and/or residual noise. By way of example, bus attenuation degrades and/or delays the incoming signal as compared to the outgoing signal of a transmitter; the associated receiver must therefore perform the subtraction relative to bus characteristics.

SUMMARY OF THE INVENTION

The above-presented limitations and issues in point-to-point duplex communications links are overcome or diminished by apparatus, systems and methods below. In one embodiment, a bi-directional communication link employs orthogonal coding to simultaneously transmit data on a bus between two points. A transmitter at each of the points employs a code to encode data for transmission on the bus. The two codes employed are substantially orthogonal, so that their cross-correlation is substantially zero. A receiver positioned at one point may then determine the signal from the transmitter at the other point without subtraction. In one embodiment, the codes are 2-bit codes, each transmitter using a separate one of the 2-bit codes. By way of example, one code may be [1,1] and the other code may be [1,0] or [0,1].

In one embodiment, each 2-bit code encodes one data bit for transmission on the bus. The use of 2-bit codes thus advantageously permits simultaneous transmission of two data bits, one traveling in each direction on the bus, during a code period of two bits. Those skilled in the art should however appreciate that longer code lengths may also be used without departing from the scope hereof. Orthogonal codes are achieved by ensuring that decoding over the code period yields a sum zero as to the unwanted signal. Orthogonal codes may further derive from Walsh, Gold or pseudo-random codes known in the art.

One advantage of the orthogonal coding is that synchronization is not required between respective transmitter-receiver pairs, so long as one of the codes includes only a sequence of 1s. In one embodiment, one transmitter at a first point on the bus encodes its data with a one-to-one ratio of 1s and 0s (e.g., with a code [0,1] or [0,0,1,1,0,1]) and transmits that encoded data to a receiver at a second point on the bus (e.g., decoding with the same [0,1] or [0,0,1,1,0,1]); the receiver at the second point synchronizes with the transmitter at the first point to ensure alignment with encoded data bits. In this embodiment, the other transmitter at the second point on the bus preferentially encodes its data with an equal number of encoding bits that are all 1s (e.g., [1,1] or [1,1,1,1,1,1], respectively), thereby avoiding synchronization between codes.

In another embodiment, both transmitters are synchronized with respective receivers between the first and second points of the bus; the codes used in this embodiment may include orthogonal codes without sequential 1s and 0s, or without a 1:1 ratio of 1s and 0s, for example [1,1,0,1,0] and [0,1,1,0,1].

In one embodiment, the bi-directional communication link is a digital bus used in digital equipment, integrated circuits, or printed circuit boards, or in complex systems embodying two or more of such circuits, boards and/or equipment. Such a link may thus replace conventional communications links described in the background above. By way of example, two ends of the communications link may reside within a single integrated circuit device, within two respective integrated circuit devices on a single circuit board, or within two respective integrated circuit devices spanning two or more circuit boards. As such, the communications link may traverse connectors, cables and back-planes of the system. The electronic circuit implementing the communications link may also be single-sided or complimentary, the latter having greater immunity to common mode noise.

In another embodiment, a plurality of bi-directional, orthogonally-encoded communications links are combined to form a parallel bus. The parallel bus may be designed with greater throughput, as compared to a single communications link, and also retain the features and benefits described above in connection with concurrent bus communications on a single communications link.

DETAILED DESCRIPTION OF THE DRAWINGS

Figure 1:
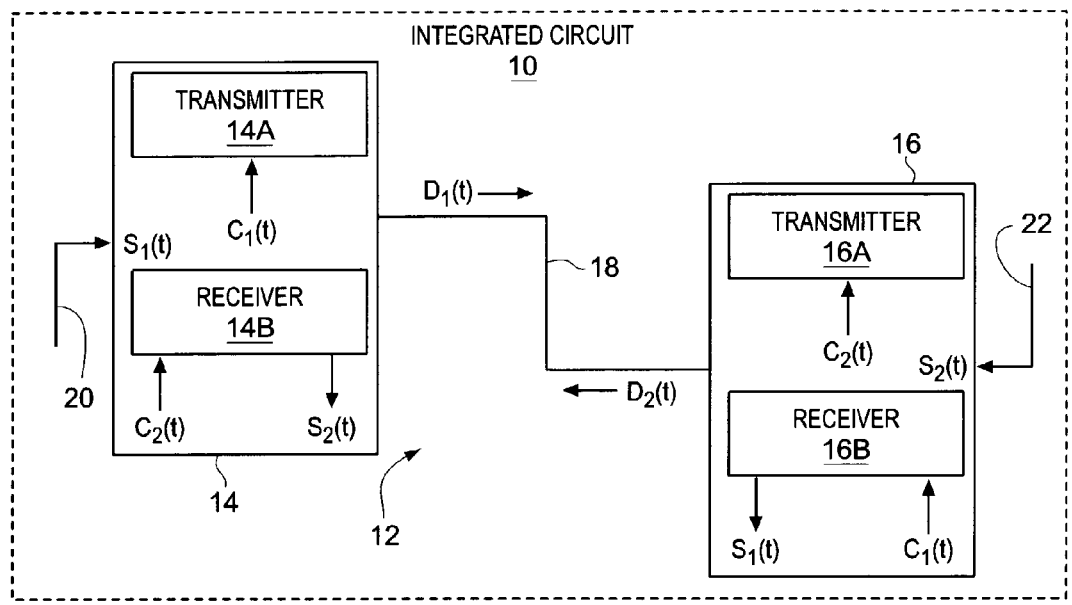
FIG. 1 shows one integrated circuit incorporating one duplex point-to-point communications link.

FIG. 1 shows an integrated circuit 10 incorporating a communications link 12 formed by device 14, device 16 and bus 18. Communications link 12 permits "point-to-point" simultaneous data communications between devices 14, 16. Each device 14, 16 may be represented by a transmitter (14A, 16A, respectively) and receiver (14B, 16B, respectively). In operation, transmitter 14A encodes signal data $S_1(t)$ of device 14 with a first code $C_1(t)$ and transmits encoded data $D_1(t)$, where $D_1(t)=(S_1(t))(C_1(t))$, to device 16. Receiver 16B decodes data $D_1(t)$ using $C_1(t)$, as shown, to reproduce signal data $S_1(t)$. Transmitter 16A similarly encodes signal data $S_2(t)$ of device 16 with a second code $C_2(t)$ and transmits encoded data $D_2(t)$, where $D_2(t)=(S_2(t))(C_2(t))$, to device 14. Receiver 14B decodes data $D_2(t)$ using $C_2(t)$, as shown, to reproduce signal data $S_2(t)$. The first and second codes are orthogonal (or substantially orthogonal), so that a cross-correlation of $C_1(t)$ with $C_2(t)$, over a periodicity of codes $C_1(t)$ and $C_2(t)$, yields zero (or substantially zero).

The periodicity of codes $C_1(t)$ and $C_2(t)$ is determined by the number of code bits in $C_1(t)$ and $C_2(t)$, each with the same number N of code bits (N≧2; N preferably an even number ≧2 to ensure zero value cross-correlation). Transmitter 14A encodes each data bit of signal $S_1(t)$ with the code bits of $C_1(t)$; transmitter 16A encodes each data bit of signal $S_2(t)$ with the code bits of $C_2(t)$.

Since the combined signal on bus 18 is $D_1(t)+D_2(t)$, receiver 14B multiplies this signal with $C_2(t)$ (producing $S_1(t)$ $C_1(t)$ $C_2(t)+S_2(t)C_2(t)C_2(t)$), and integrates over the code periodicity to render $S_2(t)$, since the first term is zero. Similarly, receiver 16B multiplies signal $D_1(t)+D_2(t)$ with $C_1(t)$ (producing $S_1(t)C_1(t)$ $C_1(t)+S_2(t)C_2(t)C_1(t)$), and integrates over the code periodicity to render $S_1(t)$, since the second term is zero.

Signal $S_1(t)$ may be generated by device 14. Alternatively, signal $S_1(t)$ may input to device 14 through a bus 20 coupled with device 14. Similarly, signal $S_2(t)$ may be generated by device 16. Alternatively, signal $S_2(t)$ may input to device 16 through a bus 22 coupled with device 16.

In one example, $C_1(t)$ is [1,1] and $C_2(t)$ is either [0,1] or [1,0]. The periodicity of codes $C_1(t)$ and $C_2(t)$ is thus 2-bits. Each data bit of signals $S_1(t)$ and $S_2(t)$ is encoded by the 2-bits of $C_1(t)$ and $C_2(t)$, respectively. In this example, transmitter 16B is preferably synchronous with receiver 14A, so that encoding/decoding may be timed with each data bit of $S_2(t)$. Nonetheless, since the incoming and outgoing signals at a particular device 14, 16 are orthogonal, synchronization is not needed with respect to these signals; even a code bit shift in the code sequence maintains the orthogonality.

To illustrate orthogonality, consider codes $C_1(i)$ and $C_2(i)$, each having a sequence of 1s and −1s (−1 illustrating logical zero). $C_1(i)$ and $C_2(i)$ are considered orthogonal when $$\sum_{i=1} C_1(i)C_2(i) = 0.$$

Accordingly, if $C_1(i)$ is [−1,−1,1,1] and $C_2(i)$ is [−1,1,1,−1], then $$\sum_{i=1} C_1(i)C_2(i) = (-1)(-1)+(-1)(1)+(1)(1)+(1)(-1) = 0;$$

and $C_2(i)$ of this example are therefore orthogonal.

Codes $C_1(t)$ and $C_2(t)$ may be represented by an infinite number of codes. Expanding on the first example, code $C_1(t)$ may for example have M 1s (e.g., [1,1,1,1,1,1]) and code $C_2(t)$ may for example have M/2 1s and M/2 0s (e.g., [0,1,0,1,0,1] or [0,0,0,1,1,1]), where M is an even integer greater than or equal to two. Once again, synchronization preferably occurs between transmitter 16B and receiver 14A so as to maintain alignment between data bits of $S_2(t)$ and the code bits of $C_2(t)$.

Other codes suitable for $C_1(t)$ and $C_2(t)$ may for example be found in connection within commonly-owned U.S. application Ser. No. 10/151,572, entitled ENCODED MULTI-ACCESS BUS SYSTEM AND METHOD, so long as a cross-correlation of $C_1(t)$ with $C_2(t)$, over a periodicity defined by the code bits, yields zero. When one of the codes $C_1(t)$ or $C_2(t)$ is not all 1s, then preferably each transmitter, receiver (e.g., transmitter 16A, receiver 14B, transmitter 14A, receiver 16B) is synchronized together to maintain alignment between code bits and signal data bits.

Those skilled in the art will appreciate that absolute orthogonality is not required. Rather, codes $C_1(t)$ and $C_2(t)$ should be sufficiently orthogonal to permit reconstruction of respective signals $S_1(t)$ and $S_2(t)$. If codes $C_1(t)$ and $C_2(t)$ are substantially orthogonal, then the cross-correlation of $C_1(t)$ with $C_2(t)$ is substantially zero, and the recovery of a desired signal (e.g., $S_1(t)$) is not substantially degraded by the resulting noise in the unwanted signal ($S_2(t)$, in this example), since the imperfect cross-correlation has substantially diminished the signal strength of $S_2(t)$.

Figure 2:
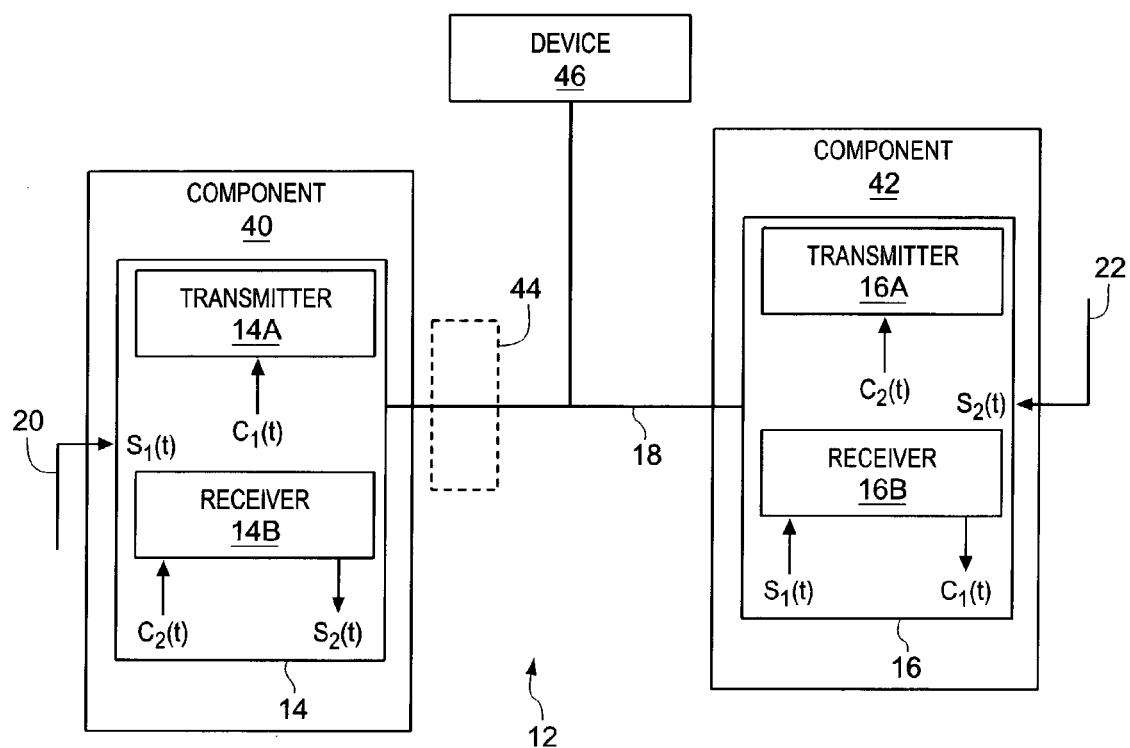
FIG. 2 shows one other duplex point-to-point communications link across multiple components or circuit boards.

Those skilled in the art should also appreciate that link 12 may be used in other digital buses connecting two components together. As shown in FIG. 2, for example, devices 14, 16 connect components 40, 42 together across bus 18. In one example, components 40, 42 represent two distinct integrated circuits on a common printed circuit board; devices 14, 16 thus represent a portion, respectively, of each of the integrated circuits 40, 42. In this example, bus 18 may cross through one or more other components 44, such as a connector, interface and/or cable. In another example, components 40, 42 represent two distinct printed circuit boards; devices 14, 16 thus represent either integrated circuits or other device circuitry respectively integrated with each printed circuit board. In this example, bus 18 may cross through one or more other components 44, such as a connector, interface, cable and/or back plane. In another example, components 40, 42 may further represent digital equipment coupled together by a bus cable 18. Those skilled in the art should appreciate that components 40, 42 may further represent mixtures of the afore-mentioned exemplary components.

FIG. 2 further illustrates that that other devices such as device 46 may couple with bus 18 to communicate with connected devices (e.g., devices 14, 16). However, during point-to-point communications between devices 14 and 16, using the orthogonal coding described, for example, in connection with FIG. 1, device 46 does not utilize bus 18. If device 46 is to communicate concurrently on bus 18, then each device 14, 16, 46 should have another pair of orthogonal codes to accommodate the concurrent communications between the three devices 14, 16, 46.

Figure 3:
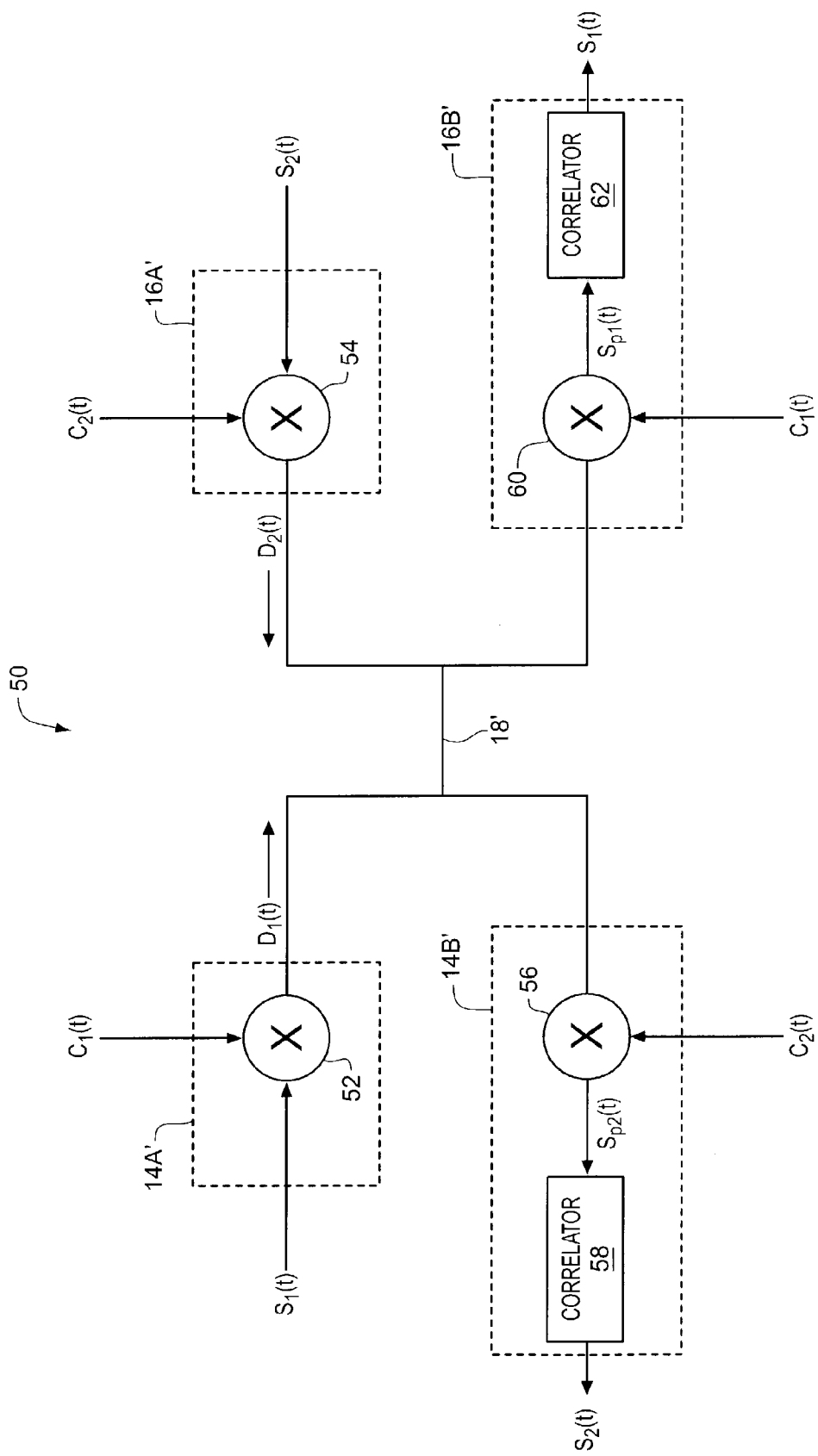
FIG. 3 shows one architecture suitable for use with transmitters and receivers of FIG. 1 and FIG. 2.

FIG. 3 shows one embodiment of transmit and receive architecture 50 suitable for use with communications link 12. Signal $S_1(t)$ is encoded by transmitter 14A' with a code $C_1(t)$ through a logic device 52 to generate $D_1(t)$. Logic device 52 may for example be a XNOR gate, with $S_1(t)$ and $C_1(t)$ input to the gate and $D_1(t)$ output from the gate. Signal $S_2(t)$ is encoded by transmitter 16A' with a code $C_2(t)$ through a logic device 54 to generate $D_2(t)$. Logic device 54 may for example be a XNOR gate, with $S_2(t)$ and $C_2(t)$ input to the gate and $D_2(t)$ output from the gate. Signal $S_2(t)$ is decoded at receiver 14B' through a logic device 56, which encodes $C_2(t)$ with $D_1(t)+D_2(t)$. Logic device 56 may for example be an analog multiplier, with $D_1(t)+D_2(t)$ and $C_2(t)$ input to analog multiplier 56 and intermediate signal $S_{p2}(t)$ output from analog multiplier 56. A correlator 58 integrates $S_{p2}(t)$ over a periodicity of $C_2(t)$ to produce $S_2(t)$. Signal $S_1(t)$ is decoded at receiver 16B' through a logic device 60, which encodes $C_1(t)$ with $D_1(t)+D_2(t)$. Logic device 60 may for example be an analog multiplier, with $D_1(t)+D_2(t)$ and $C_1(t)$ input to analog multiplier 60 and intermediate signal $S_{p1}(t)$ output from analog multiplier 60. A correlator 62 integrates $S_{p1}(t)$ over a periodicity of $C_1(t)$ to produce $S_1(t)$.

Those skilled in the art should appreciate that when for example code $C_1(t)$ includes only a sequence of 1s, then logical devices 52 and 60 are not required, as a multiplication of code $C_1(t)$ with $S_1(t)$ at transmitter 14A' only reproduces $S_1(t)$, and as multiplication of $C_1(t)$ with $D_1(t)+D_2(t)$ input to receiver 16B' reproduces $D_1(t)+D_2(t)$.

Figure 4:
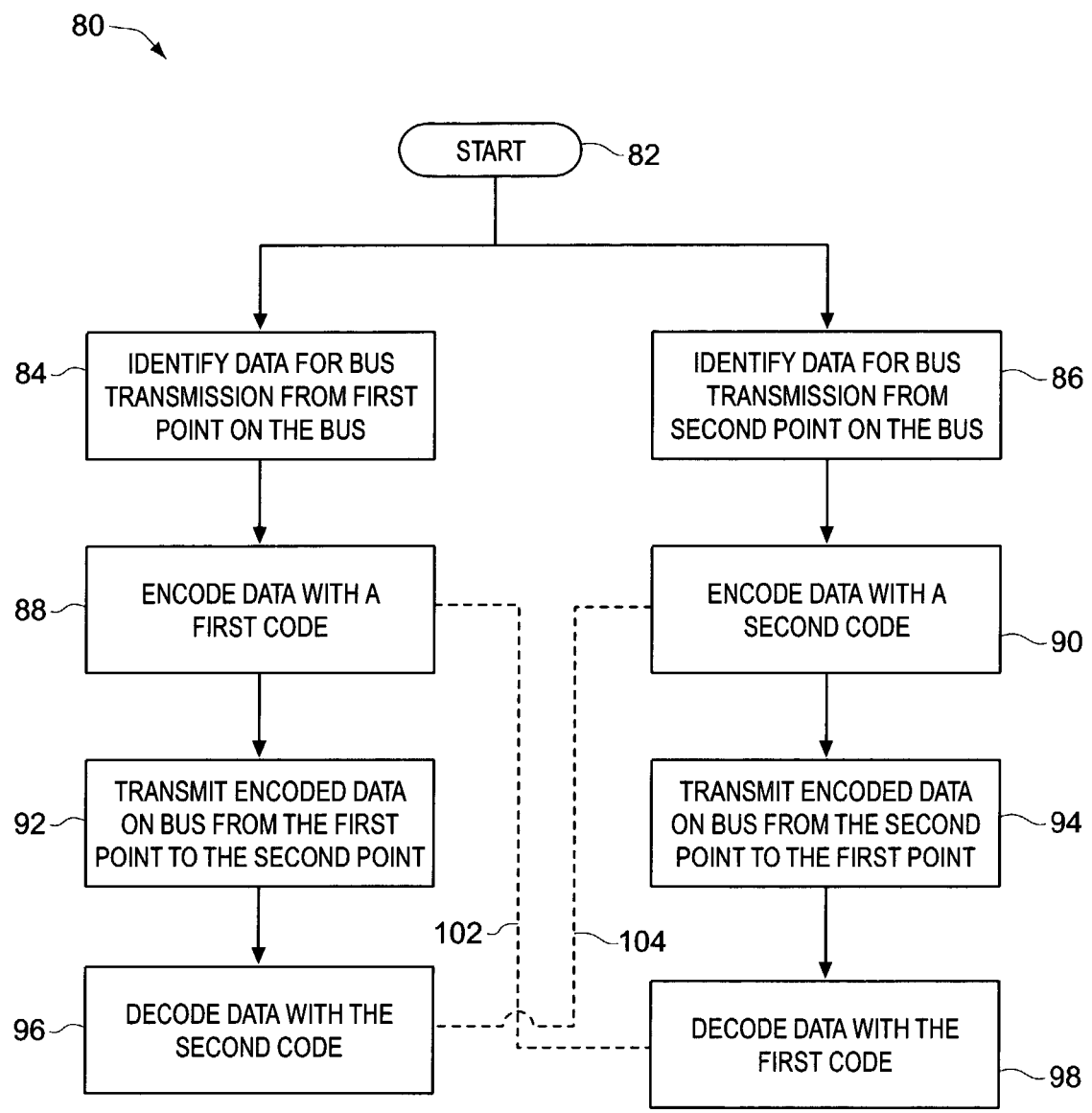
FIG. 4 is a flowchart illustrating one process for communicating data on a point-to-point communications link.

FIG. 4 shows a flowchart illustrating one process 80 for transmitting data through point-to-point bi-directional communications. At start 82, an initialization occurs between a first device (e.g., device 14, FIG. 1) at a first point on the bus and a second device (e.g., device 16, FIG. 1) at a second point on the bus. The initialization may for example include sending a training sequence from one device to another, so that the devices know that a point-to-point bi-directional communications link is established. At step 84, the first device identifies data for transmission on the bus; step 84 may for example use data within the first device or data input to the first device. At step 86, the second device identifies data for transmission on the bus; step 86 may use data within the second device or data input to the second device. Data is encoded in steps 88, 90. Specifically, in step 88, data at the first device is encoded with a first code, e.g., $C_1(t)$; in step 90, data at the second device is encoded with a second code, e.g., $C_2(t)$. Data from the first point on the bus is transmitted to the second point on the bus in step 92. Steps 88 and 92 may occur substantially simultaneously, such as through the gate architecture described in connection with FIG. 3. Data from the second point on the bus is transmitted to the first point on the bus in step 94. Steps 90 and 94 may occur substantially simultaneously, such as through the gate architecture described in connection with FIG. 3. Data transmitted on the bus from the second point is decoded at the first point using the second code, in step 96. By way of example, step 96 may include encoding the complex signal from the bus with the second code and integrating over a periodicity of the codes to resolve the data from the second point. Data transmitted on the bus from the first point is decoded at the second point using the first code, in step 98. By way of example, step 98 may include encoding the complex signal from the bus with the first code and integrating over a periodicity of the codes to resolve the data from the first point.

In one embodiment, step 88 encodes data at the first point with a code comprising a sequence of 1s, e.g., [1,1] or [1,1,1] or [1,1,1,1,1]. Step 90 then may encode data at the second point with a code comprising an even number of 1s and 0s, e.g., [1,0] or [1,1,0,0] or [0,1,0,1,0,1], respectively. Steps 88 and 98 are synchronous with one another, as illustrated by synchronous line 102, to align encoding/decoding data bits. Steps 88, 98 may be synchronized by a common clock signal, for example. Steps 90 and 96 are synchronous with one another, as illustrated by synchronous line 104, to align encoding/decoding data bits. Steps 90, 96 may be synchronized by a common clock signal, for example. When one of the codes is all 1s, as in the above example, steps 88, 98 may occur asynchronously to steps 90, 96; that is, one transmit-receive pair (e.g., transmitter-receiver pair 14A, 16B, FIG. 1) may operate asynchronous from the other transmit-receive pair (e.g., transmitter-receiver pair 16A, 14B, FIG. 1).

Those skilled in the art should appreciate that other codes may be used in steps 88, 90, 96, 98, so long as the first and second codes are substantially orthogonal.

Data transmissions that are encoded with orthogonal codes may be slower than the effective transmission on the bus that might occur for a given clock rate. In one example, the codes are 2-bits in length; thus, one-directional data transmissions on the bus in this example may occur at up to one-half the of the non-encoded data rate, for a given clock speed. This apparent slow-down along one direction of the bus may be compensated by increasing the clock speed by a two-factor. However since data may be transmitted simultaneously in both directions, the overall bus throughput is approximately the same for the given clock speed, as compared to a prior art communications link utilizing time-shared transmissions.

Figure 5:
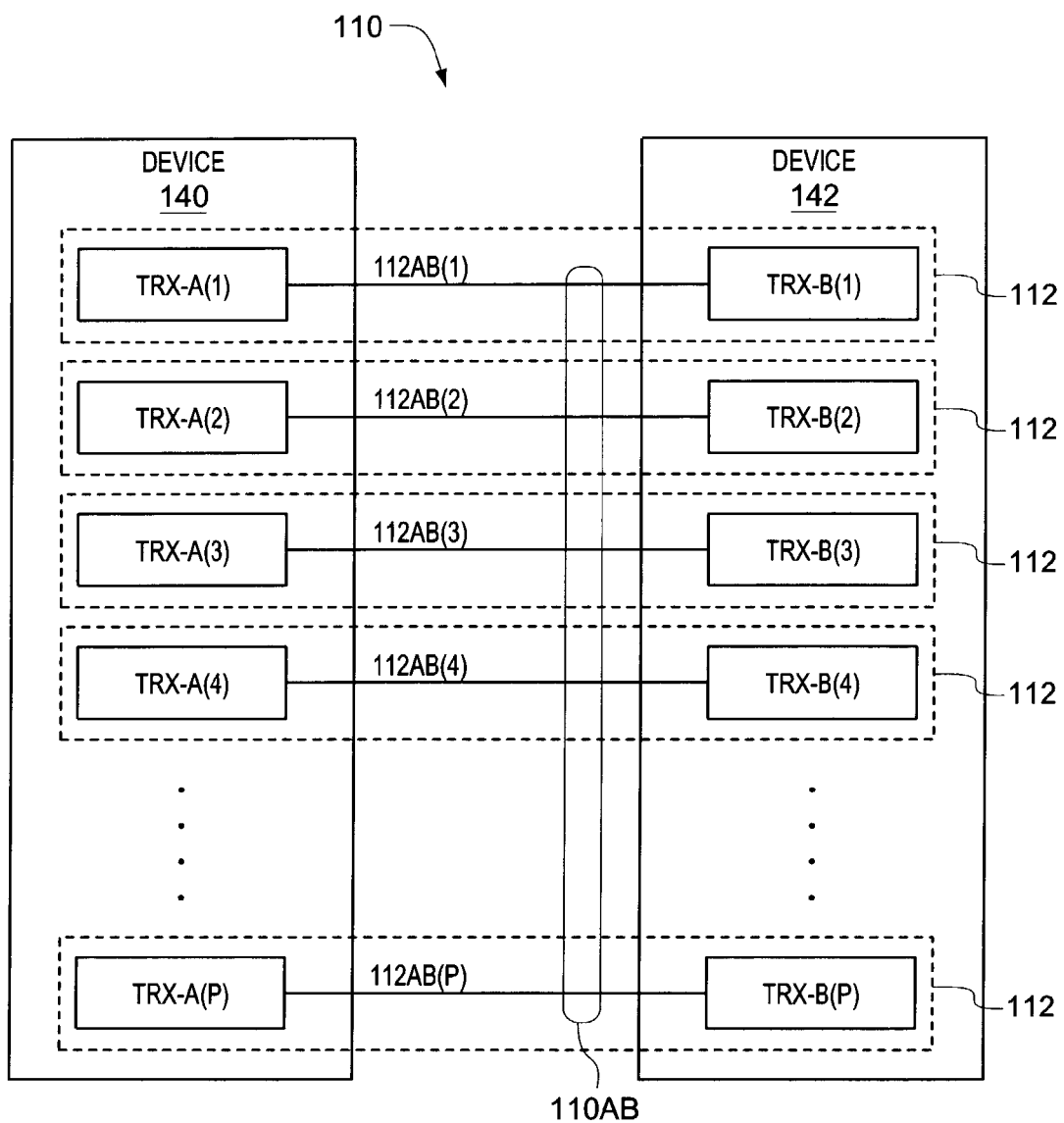
FIG. 5 shows one multi-bus point-to-point communications link.

FIG. 5 illustrates one communications link 110 that includes an integer number (P) of single communications links 112. Each link 112 for example operates like link 12 of FIG. 1 and FIG. 2. Link 110 may thus boost bus throughput and serve functions such as parallel data transmissions between devices 140, 142, as shown. Each link 110 includes a transmitter-receiver pair TRX-A, TRX-B and bus 112AB. Collectively, buses 112AB(1)-112AB(P) represent a parallel bus 110AB. Though link 110 is shown with "P" links 112, where P≧5, more or fewer links 112 may form link 110. Moreover, those skilled in the art should appreciate that the transmitter-receivers TRX may be combined into a single unit. By way of example, transmitter-receiver units TRX-A may be formed as a single integrated circuit. Transmitter-receiver units TRX-B likewise may be formed as a single integrated circuit.

What is claimed is:

1. An orthogonal data link, comprising:
   a first digital device;
   a second digital device; and
   a bus coupling the first digital device to the second digital device;
   the first digital device having a first transmitter for encoding first data with a first code for transmission on the bus, the second device having a second transmitter for encoding second data with a second code for transmission on the bus, the encoding of the first data being asynchronous to the encoding of the second data, the first device having a first receiver for decoding the second data with the second code, the second device having a second receiver for decoding the first data with the first code, the first and second codes being substantially orthogonal with one another, the first code comprising N 1s and no 0s, the second code comprising N/2 1s and N/2 0s, N being an even integer greater than or equal to 2.

2. A data link of claim 1, each of the codes comprising 2-bits.

3. A data link of claim 2, the first code comprising [1,1], the second code comprising one of [1,0] or [0,1].

4. A data link of claim 1, each of the first and second digital devices comprising distinct integrated circuits.

5. A data link of claim 1, the first and second digital devices being integrated within a common integrated circuit.

6. A data link of claim 1, the first digital device comprising first circuitry within a first printed circuit board, the second device comprising second circuitry within a second printed circuit board.

7. A data link of claim 6, at least one of the first and second circuitry comprising an integrated circuit.

8. A data link of claim 6, the bus comprising one or more intermediate components.

9. A data link of claim 8, the intermediate components comprising one or more of a connector, cable, back plane and electronic interface.

10. A data link of claim 1, the second transmitter and the first receiver being synchronized, the first transmitter and the second receiver being synchronized.

11. A data link of claim 1, one or both of the first and second transmitters comprising a XNOR gate, for encoding data.

12. A data link of claim 1, the first receiver comprising an analog multiplier for encoding signals on the bus with the second code.

13. A data link of claim 12, the first receiver comprising a first correlator for integrating a signal from the analog multiplier over a periodicity of the second code.

14. A data link of claim 1, the second receiver comprising an analog multiplier for encoding signals on the bus with the first code.

15. A data link of claim 14, the second receiver comprising a second correlator for integrating a signal from the analog multiplier over a periodicity of the first code.

16. A method for point-to-point bi-directional communications, comprising the steps of:
  encoding first data with a first code having N 1s and no 0s at a first point on a bus, N being an even integer greater than or equal to two;
  encoding second data with a second code having N/2 1s and N/2 0s at a second point of the bus, the first and second codes being substantially orthogonal, wherein the encoding of the first data is asynchronous to the encoding of the second data;
  decoding the second data at the first point using the second code; and
  decoding the first data at the second point using the first code.

17. A method of claim 16, the step of encoding first data comprising transmitting encoded first data on the bus, the step of encoding second data comprising transmitting encoded second data on the bus.

18. A method of claim 17, the step of encoding first data comprising using a first XNOR gate, the step of encoding second data comprising using a second XNOR gate.

19. A method of claim 16, the step of decoding the first data comprising integrating over a periodicity defined by the codes, the step of decoding the second data comprising integrating over the periodicity defined by the codes.

20. A method of claim 19, the step of decoding the first data comprising multiplying signals on the bus with the first code.

21. A method of claim 19, the step of decoding the second data comprising multiplying signals on the bus with the second code.

22. A method of claim 16, the step of encoding first data comprising multiplying the first data with the first code, the step of encoding second data comprising multiplying the second data with the second code.

23. A method of claim 16, further comprising the steps of synchronizing the steps of encoding the second data and decoding the second data, and synchronizing the steps of encoding the first data and decoding the first data.

24. A method of claim 16, the step of encoding the first data comprising utilizing a first code of [1,1], the step of encoding the second data comprising utilizing a second code of either [1,0] or [0,1].

25. A system for bus communications, comprising: a first integrated circuit connected to a second integrated circuit by a bus, the first integrated circuit encoding first data with a first code for transmission on the bus, the second integrated circuit encoding second data with a second code for transmission on the bus, wherein the encoding of the first data occurs asynchronously to the encoding of the second data, the second integrated circuit rendering the first data by multiplying signals on the bus with the first code and integrating over a periodicity defined by the codes, the first integrated circuit rendering the second data by multiplying the signals on the bus with the second code and integrating over the periodicity defined by the codes, wherein a cross-correlation between the first and second codes is substantially zero, the first code comprising N 1s and no 0s, the second code comprising N/2 1s and N/2 0s, N being an even integer greater than or equal to 2.

26. An orthogonal data link, comprising:
  a first digital device;
  a second digital device; and
  a bus coupling the first digital device to the second digital device;
  the first digital device transmitting an unencoded first signal on the bus;
  the second digital device having a transmitter for encoding a second signal with a code for transmission on the bus, wherein the transmitting and the encoding occur asynchronously;
  the first digital device having a first receiver for decoding the second signal with the code and over a periodicity of the code, the second digital device having a second receiver for correlating the unencoded first signal with the encoded second signal, the code comprising an even number of 1s and 0s.

27. An orthogonal link of claim 26, the first receiver comprising an analog multiplier for encoding bus signals with the code.

28. An orthogonal link of claim 27, the transmitter comprising an XNOR gate.

29. An orthogonal link of claim 27, the first receiver comprising a first correlator for integrating a signal from the analog multiplier over a periodicity of the code, the second receiver comprising a second correlator for integrating the bus signals over the periodicity of the code.

* * * * *